United States Patent
Mizell

(10) Patent No.: US 9,311,731 B2
(45) Date of Patent: *Apr. 12, 2016

(54) DYNAMIC GRAPH SYSTEM FOR A SEMANTIC DATABASE

(71) Applicant: Cray Inc., Seattle, WA (US)

(72) Inventor: David Mizell, Sammamish, WA (US)

(73) Assignee: Cray Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/570,073

(22) Filed: Dec. 15, 2014

(65) Prior Publication Data

US 2015/0138206 A1    May 21, 2015

Related U.S. Application Data

(63) Continuation of application No. 13/777,884, filed on Feb. 26, 2013, now Pat. No. 8,943,068.

(51) Int. Cl.
  *G06F 17/20* (2006.01)
  *G06T 11/20* (2006.01)
  *G06F 17/30* (2006.01)

(52) U.S. Cl.
  CPC ........ *G06T 11/206* (2013.01); *G06F 17/30321* (2013.01)

(58) Field of Classification Search
  USPC .................................................. 707/743, 798
  See application file for complete search history.

(56) References Cited

U.S. PATENT DOCUMENTS

| | | | | |
|---|---|---|---|---|
| 5,963,642 A * | 10/1999 | Goldstein | ...................... | 713/193 |
| 6,456,998 B1 * | 9/2002 | Bui et al. | | |
| 8,155,992 B2 * | 4/2012 | Ekhaus et al. | ................ | 705/7.29 |
| 8,411,952 B2 * | 4/2013 | Chefd'hotel et al. | ......... | 382/180 |
| 8,472,792 B2 * | 6/2013 | Butt et al. | ...................... | 386/345 |
| 8,693,597 B2 * | 4/2014 | Sexton et al. | ................. | 375/346 |
| 8,731,369 B2 * | 5/2014 | Li et al. | ...................... | 386/244 |
| 8,751,556 B2 * | 6/2014 | Song | ............................ | 708/607 |
| 8,775,495 B2 * | 7/2014 | Lumsdaine et al. | .......... | 708/520 |
| 8,787,186 B2 * | 7/2014 | Sexton et al. | ................. | 370/252 |
| 8,836,557 B2 * | 9/2014 | Eldar et al. | .................... | 341/122 |
| 8,943,068 B2 | 1/2015 | Mizell et al. | | |
| 2014/0258689 A1 * | 9/2014 | Song | ............................ | 712/221 |

OTHER PUBLICATIONS

"Buluc, Aydin et al., "The Combinatorial BLAS: Design, Implementation, and Applications," The International Journal of High Performance Computing Application, 2011, 40 pages."

(Continued)

*Primary Examiner* — Kim Nguyen
(74) *Attorney, Agent, or Firm* — Perkins Coie LLP

(57) ABSTRACT

A method and system in a computer system for dynamically providing a graphical representation of a data store of entries via a matrix interface is disclosed. A dynamic graph system provides a matrix interface that exposes to an application program a graphical representation of data stored in a data store such as a semantic database storing triples. To the application program, the matrix interface represents the graph as a sparse adjacency matrix that is stored in compressed form. Each entry of the data store is considered to represent a link between nodes of the graph. Each entry has a first field and a second field identifying the nodes connected by the link and a third field with a value for the link that connects the identified nodes. The first, second, and third fields represent the rows, column, and elements of the adjacency matrix.

14 Claims, 8 Drawing Sheets

(56) References Cited

OTHER PUBLICATIONS

"Dongarra, Jack, "Compressed Row Storage," Nov. 20, 1995, [retrieved on Apr. 13, 2012], Retrieved from the Internet: URL: http://netlib.org/linalg/html_templates/node91.html, 1 page."

"Lugowski, Adam et al., "A Flexible Open-Source Toolbox for Scalable Complex Graph Analysis," SIAM, SDM 2012, Apr. 26-28, 2012, 12 pages."

"Lugowski, Adam et al., "Scalable Complex Graph Analysis with the Knowledge Discovery Toolbox," IEEE, ICASSP 2012, Mar. 25-30, 2012, 4 pages."

* cited by examiner

DYNAMIC GRAPH SYSTEM FOR A SEMANTIC DATABASE

CROSS-REFERENCE TO RELATED APPLICATION(S)

This application is a continuation of U.S. patent application Ser. No. 13/777,884 filed Feb. 26, 2013, entitled "DYNAMIC GRAPH SYSTEM FOR A SEMANTIC DATABASE" which is incorporated herein by reference in its entirety.

STATEMENT REGARDING FEDERALLY SPONSORED RESEARCH

This invention was made with Government support under Battelle Memorial Institute, Pacific Northwest Division, contract #69356 awarded by the United States Department of Energy. The Government has certain rights in the invention.

BACKGROUND

Semantic data models allow relationships between resources to be modeled as facts. The facts are often represented as triples that have a subject, a predicate, and an object. For example, one triple may have the subject of "John Smith," the predicate of "ISA," and the object of "physician," which may be represented as <John Smith, ISA, physician>.

This triple represents the fact that John Smith is a physician. Other triples may be <John Smith, graduate of, University of Washington> representing the fact that John Smith graduated from the University of Washington and <John Smith, degree, MD> representing the fact that John Smith has an MD degree. Semantic data models can be used to model the relationships between any types of resources such as web pages, people, companies, products, meetings, and so on. One semantic data model, referred to as the Resource Description Framework ("RDF"), has been developed by the World Wide Web Consortium ("W3C") to model web resources but can be used to model any type of resource. The triples of a semantic data model may be stored in a semantic database.

The triples of a semantic database may be viewed as representing a graph with the subjects and objects as nodes and the predicates as links between nodes. FIG. 1 is a graphical representation of an example semantic database. The example semantic database includes the following triples:

<John Smith, ISA, college graduate>
<John Smith, graduate of, University of Washington>
<John Smith, degree, MD>
<John Smith, parent of, Bob Smith>
<John Smith, ISA, male>
<Bob Smith, child of, John Smith>
<Bob Smith, ISA, male>
<MD, ISA, post-graduate degree>

The graph 100 includes nodes 111-117 representing entities (subjects or objects) of John Smith, Bill Smith, male, college graduate, University of Washington, MD, and post-graduate degree. The links between the nodes are labeled with the corresponding predicate. For example, the link between node 111 for John Smith and node 115 for University of Washington is labeled with "graduate of," representing the following triple:

<John Smith, graduate of, University of Washington>.

The graph thus includes one link for each triple.

Many graph algorithms can be employed to identify various characteristics of and perform various processes on graphs. For example, the graph algorithms may identify subgraphs that are not connected to other subgraphs, spanning trees of the graphs, cliques within the graph, and so on. These graph algorithms typically represent a graph as a matrix, often referred to as an adjacency matrix, with a row and a column for each node with the elements of the matrix representing links between the nodes. An adjacency matrix may represent the presence of a link between nodes with a non-zero value (e.g., 1) in the corresponding element of the matrix and the absence of a link between nodes with a zero value in the corresponding element of the matrix. The non-zero values may represent weights of the links. An adjacency matrix may represent both graphs that are directed (as FIG. 1) and graphs that are not directed. For a directed graph, the rows represent source nodes and the columns represent the sink nodes.

One well-known algorithm that processes a graph is the PageRank algorithm. The PageRank algorithm generates a ranking of the importance of web pages. The PageRank algorithm represents the World Wide Web as a graph with a node for each web page with links between the nodes representing links between web pages. Because the Web includes hundreds of millions of web pages, the amount of storage needed to store an adjacency matrix representing a graph of the Web is very large (e.g., $O(n^2)$ where n is the number of web pages). Many other domains (e.g., physics and bioinformatics) also require vast amounts of storage space to store each element of a matrix representing a graph.

In many of these domains, the matrices representing a graph are sparse—that is, the vast majority of the elements contain the same value (e.g., zero), referred to as a distinguished value. For example, a graph representing the Web is very sparse as each web page typically has links to only a very small fraction of a percent of the total number of web pages. Because most of the elements of such a sparse matrix have the distinguished value, the sparse matrix can be stored in a compressed form by explicitly storing only elements with non-distinguished values along with a mapping of rows and columns to those stored elements. When an algorithm is to access an element at a row and a column of such a sparse matrix, the mapping is checked to determine whether that element is stored—that is, whether the element has a non-distinguished value. If so, the non-distinguished value is retrieved and returned as the value of that row and column. Otherwise, the distinguished value is returned as the value of that row and column. One technique for mapping elements to non-distinguished values is referred to as compressed sparse row ("CSR") as described below in detail. In some cases, these techniques can reduce the storage space needed to represent the sparse matrix by orders of magnitude. Another technique for mapping elements to non-distinguished values is referred to as an edge list. An edge list is a list of pairs of nodes that have links between them and, if the links are weighted, a weight for each link.

FIG. 2 illustrates a compressed row storage form of a matrix. The matrix 200 includes five rows and five columns and has 25 elements with 19 elements having a zero value (i.e., distinguished). A CSR data structure 250 represents the CSR form of the matrix 200. The CSR data structure includes a row table 260 and a column table 270. The row table contains an entry for each row of the table with a pointer to an entry in the column table. The column table contains an entry for each element with a non-distinguished value. Each entry of the row table points to a sequence of entries in the column table representing the columns with a non-distinguished value along with that non-distinguished value of that row and column. For example, the element of the matrix 200 in the third row and second column has a value of −4. To represent this element, the third row of the row table points to the fifth entry of the column table that indicates that the second column has a value of −4.

Many implementations of graph algorithms assume that the corresponding matrix is represented in a CSR form and access the matrix via a CSR interface. A CSR interface typically provides a function that is passed a row and a column, accesses the CSR data structure, and returns the value of the corresponding element. To access a semantic database, rather than a matrix represented in CSR form, a new implementation of a graph algorithm would need to be developed (or a existing implementation would need to be revised) to access a semantic database. Such development of a new implementation (or revision of an existing implementation) would be both costly and time-consuming.

DETAILED DESCRIPTION

Figure 1:
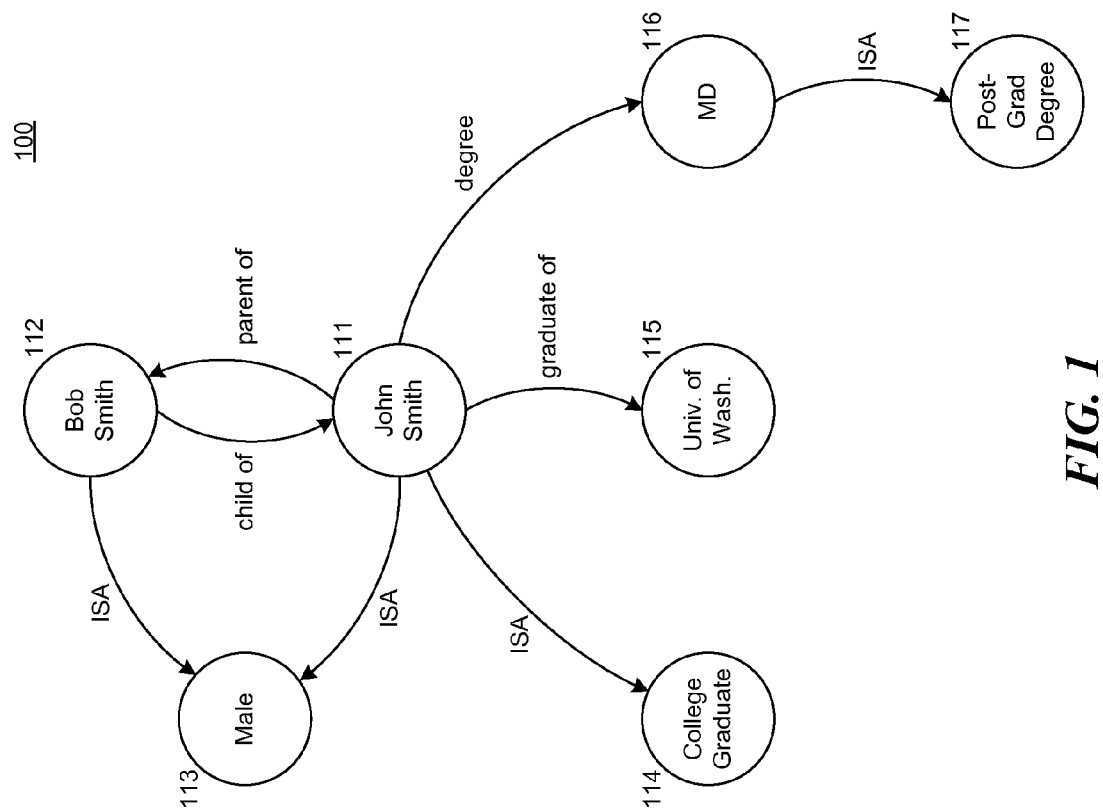
FIG. 1 is a graphical representation of an example semantic database.

A method and system in a computer system for dynamically providing a graphical representation of a data store of entries via a matrix interface is disclosed. In some embodiments, a dynamic graph system provides a matrix interface that exposes to an application program a graphical representation of data stored in a data store such as a semantic database storing triples. To the application program, the matrix interface represents the graph as a sparse adjacency matrix that is stored in compressed form. Each entry of the data store is considered to represent a link between nodes of the graph. Each entry has a first field and a second field identifying the nodes connected by the link and a third field with a value for the link that connects the identified nodes. For example, when the data store is a semantic database, the subject field and the object field of the entries may represent nodes of the graph and the predicate field may represent the weight or value of the link. The dynamic graph system maps the values of the subject field and the object field to a unique node identifier. For example, if an entry represents the triple:
  <John Smith, graduate of, University of Washington>,
then the subject, "John Smith," may map to the unique node identifier of 1 and the object, "University of Washington," may map to the unique node identifier of 2. The dynamic graph system employs the unique node identifiers to identify rows and columns of the matrix. In this example, the triple would be represented by the element at row 1 and column 2 of the matrix and the element would have a value of one representing the presence of a link between the nodes or may have another non-distinguished value representing a weight corresponding to the predicate "graduate of." Existing graph algorithms can thus use the matrix interface of the dynamic graph system to process a graphical representation of the underlying data store that is a table of entries.

In the following, the dynamic graph system is described in the context of embodiments in which the data store is a triple table of a semantic database. The dynamic graph system preprocesses the triple to generate one or more indexes to facilitate retrieval of elements of the adjacency matrix representing a graph of the triple table. The dynamic graph system may generate an index that maps row identifiers (i.e., subjects) of the matrix to the triples of the triple table representing columns of that row with non-distinguished values. The index may map row identifiers to a list of pointers to the triples. The dynamic graph system may generate the index for either the row dimension or the column dimension of the matrix or may generate indexes for both the row and column dimensions. To retrieve elements from the matrix, the dynamic graph system receives via its matrix interface requests from an application program to retrieve an element from the matrix for a row (i.e., a first dimension) and a column (i.e., a second dimension). The dynamic graph system identifies from the index triples of the triple table that have a value for the subject that matches the row. The dynamic graph system then determines whether any of the identified triples have an object that matches the column. Upon determining that an identified triple has a matching object, the dynamic graph system returns the value of the predicate of that triple as the value of the element of the matrix for the row and column. Upon determining that no identified triple has an object that matches the column, the dynamic graph system returns the distinguished value as the value of the element of the matrix for the row and column.

Figure 2:
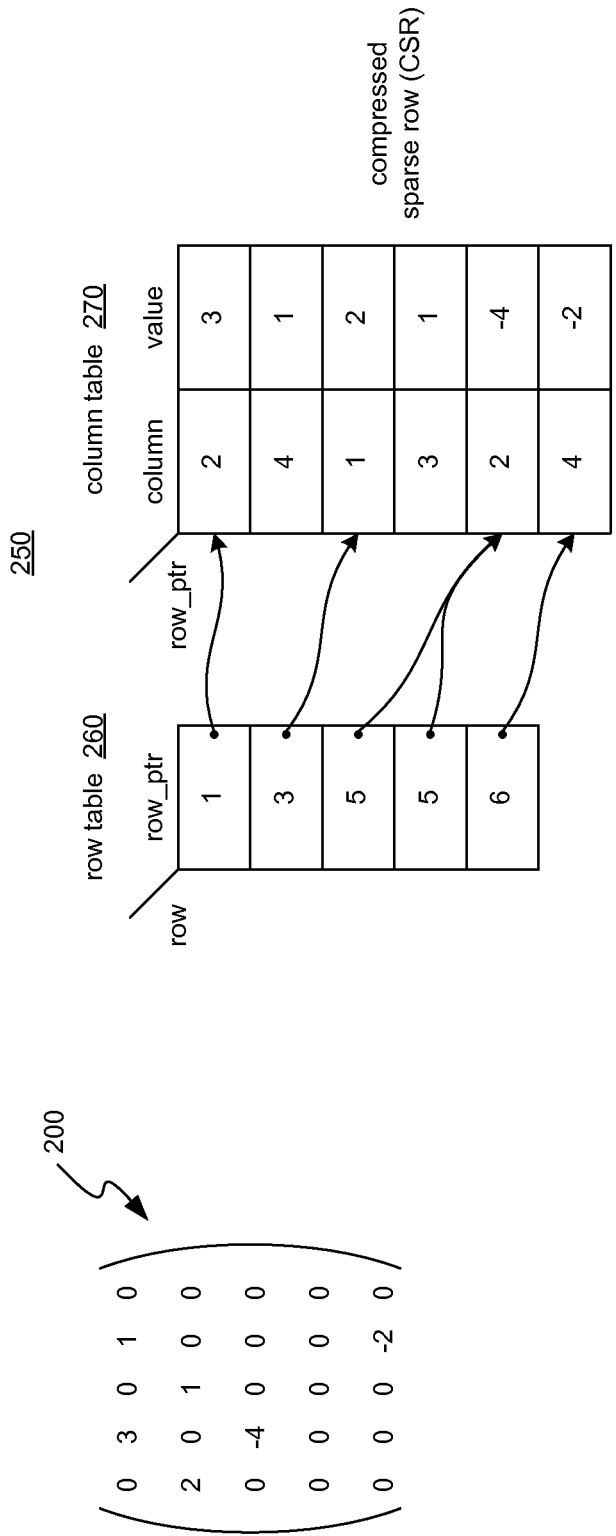
FIG. 2 illustrates a compressed row storage form of a matrix.
Figure 3:
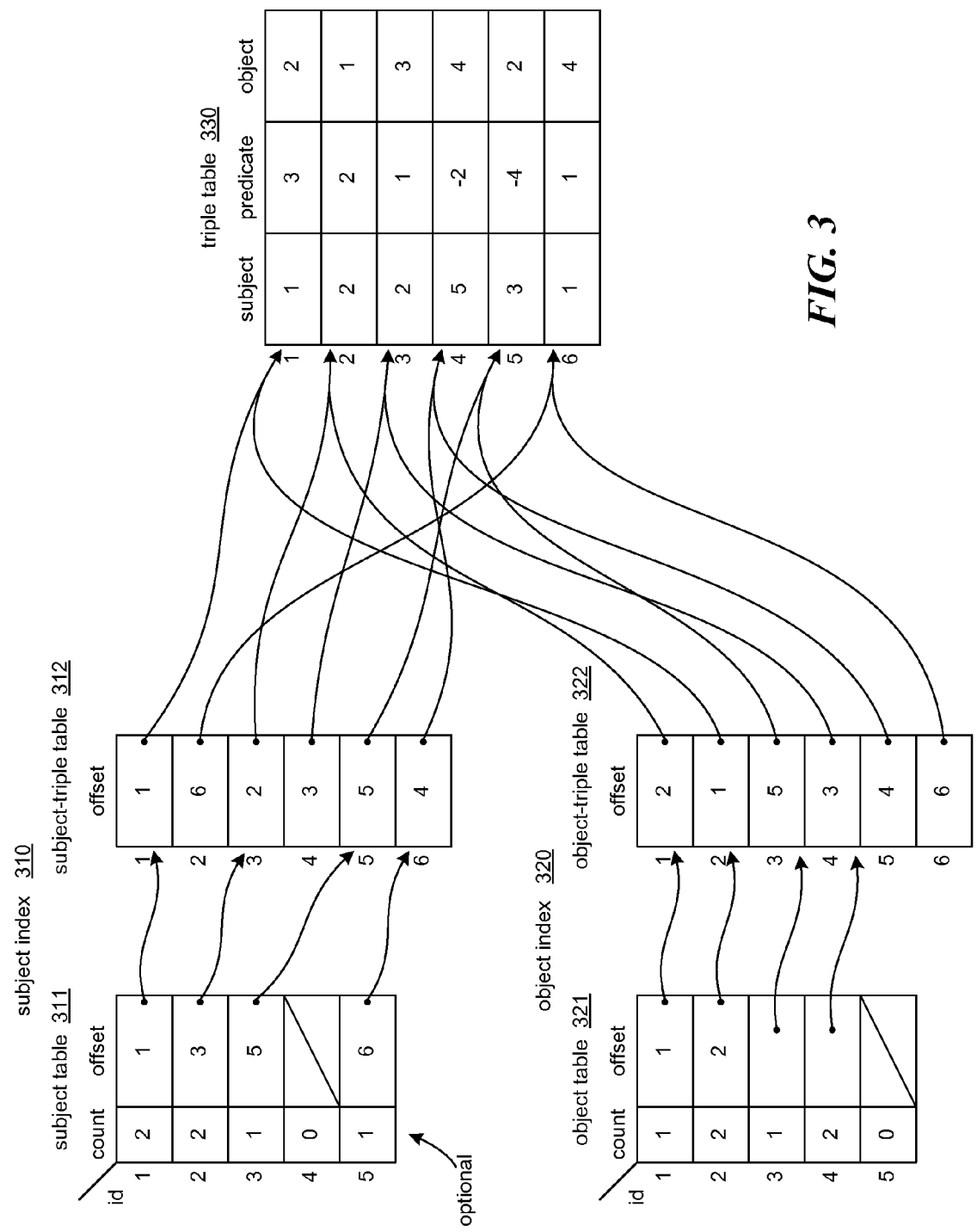
FIG. 3 is a block diagram illustrating data structures of the dynamic graph system in some embodiments.

FIG. 3 is a block diagram illustrating data structures of the dynamic graph system in some embodiments. The data structures include a subject index 310 and an object index 320 for a triple table 330 that is a collection of data that may be compatible with a Resource Description Framework database. In the example of FIG. 3, the triple table is an edge list that includes six triples corresponding to the adjacency matrix 200 of FIG. 2. The first triple in the triple table represents the triple of <1, 3, 2>, where the subject is represented by the node identifier of 1, the predicate is represented by a link identifier of 3, and the object is represented by the node identifier of 2. The subject index maps subjects to the triples that contain those subjects and includes a subject table 311 and a subject-triple table 312. The subject table includes an entry for each row of the adjacency matrix (or node of the graph represented by the triple table). For example, the second entry in the subject table corresponds to the subject represented by the identifier of 2 or the second row of the adjacency matrix. Each entry includes an offset and an optional count. The offset points to an entry in the subject-triple table. The count indicates the number of triples in the triple table with that subject and is optional because the count can be derived from the offsets of the subject table. The subject-triple table contains an entry for each triple of the triple table with the entries ordered by row and then optionally by column within row. For example, entries 1 and 2 of the subject-triple table correspond to row 1 and columns 2 and 4 of the adjacency matrix and point to triples 1 and 6 of the triple table. The object index includes an object table 321 and an object-triple table 322. The object index maps objects to triples that contain those objects in a way that is similar to the way the subject index maps subjects to triples.

Figure 4:
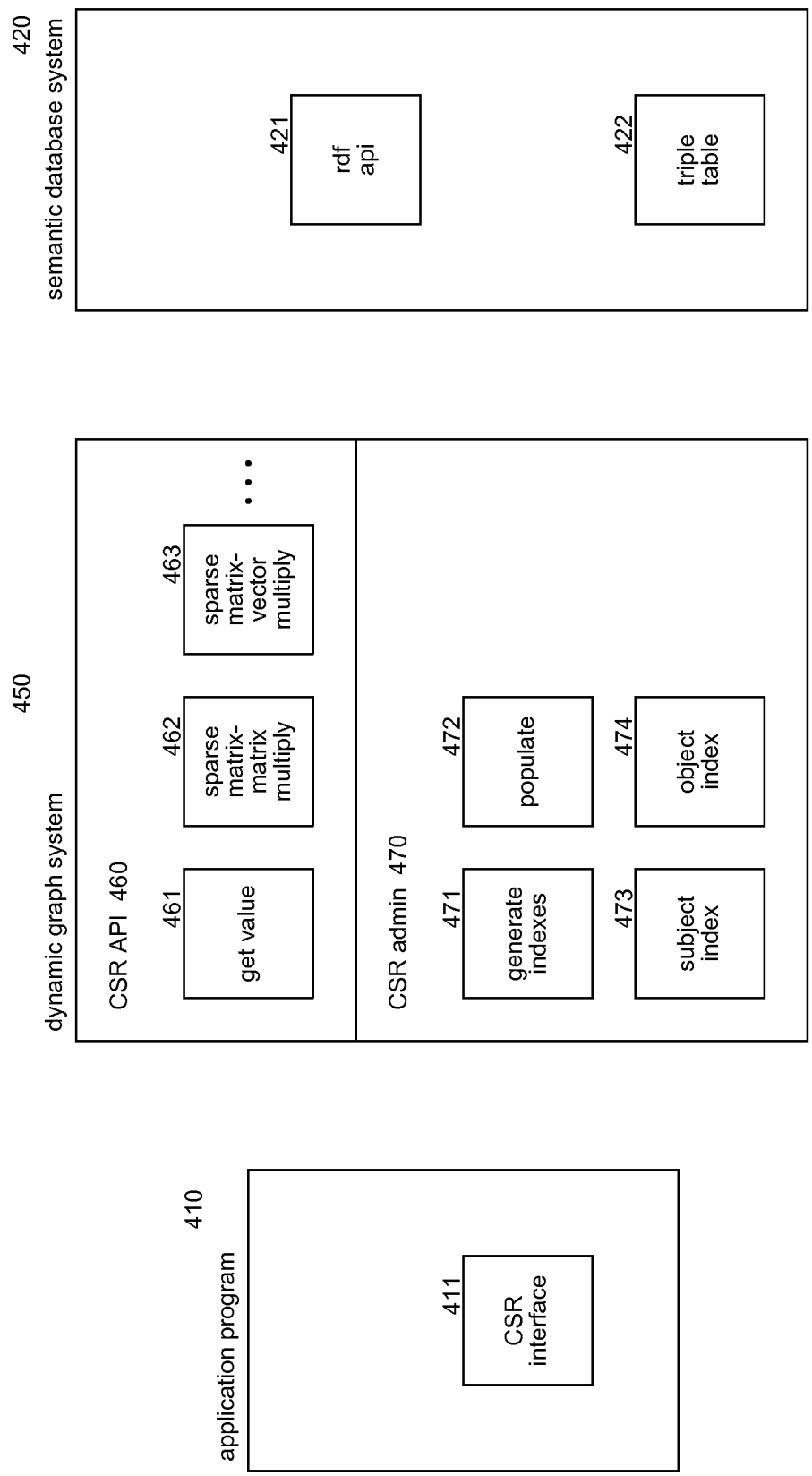
FIG. 4 is a block diagram illustrating components of the dynamic graph system in some embodiments.

FIG. 4 is a block diagram illustrating components of the dynamic graph system in some embodiments. The dynamic graph system 450 interfaces with an application program 410 and a semantic database system 420. The semantic database system 420 includes an RDF application program interface ("API") 421 and a triple table 422. The RDF API provides an interface for accessing the triples in the triple table. The application program include a CSR interface 411 for accessing an adjacency matrix stored in a CSR form. The dynamic graph system includes a CSR API 460 and a CSR administrative component 470. The CSR API provides various functions for accessing the adjacency matrix representation of the triple table. The functions may include a get value function 461, a sparse matrix-matrix multiply function 462, and a sparse matrix-vector multiply function. The get value function is passed a row and column and returns the value of the corresponding element from the adjacency matrix. The sparse matrix-matrix multiply function is passed two matrices and returns a matrix that is the product of those matrices. The sparse matrix-vector multiply function is passed a matrix and a vector and returns a vector that is the product of the matrix and the vector. The CSR API may include other functions typically supported by a CSR API such as functions to retrieve a row or column of the matrix, to calculate an average value of the matrix, and so on. The function may also allow for updating elements of the matrix based on scalar addition and multiplication, matrix addition, and so on. If the CSR API allows elements to be changed from distinguished values to non-distinguished values or vice versa, then the dynamic graph system may maintain an auxiliary data structure to track triples added to or removed from the triple table. After retrieving a value for an element based on the triple table, the dynamic graph system may check the auxiliary data structure to see if the element has been updated. The dynamic graph system may periodically regenerate the indexes to reflect changes to the triple table. The CSR administrative component includes a generate indexes component 471 and a populate component 472. The CSR administrative component may also include a subject index 473 and an object index 474. The generate indexes component generates the subject index and the object index corresponding to the triple table. The populate component may be invoked to populate the triple table with a supplied matrix. However, the triple table may in general be an existing triple table that is to be dynamically treated as a graph.

The processor on which the dynamic graph system may be implemented may include a central processing unit and local memory and may include input devices (e.g., keyboard and pointing devices), output devices (e.g., display devices), and storage devices (e.g., disk drives). The processors may access computer-readable media that includes computer-readable storage media and data transmission media. The computer-readable storage media includes memory and other storage devices that may have recorded upon or may be encoded with computer-executable instructions or logic that implements the dynamic graph system. The data transmission media is media for transmitting data using signals or carrier waves (e.g., electromagnetism) via a wired or wireless connection. Various functions of the dynamic graph system may also be implemented on devices using discrete logic or logic embedded as an application-specific integrated circuit. The devices on which the dynamic graph system is implemented are computing devices and may include a massively parallel processor ("MPP") computing system.

The dynamic graph system may be described in the general context of computer-executable instructions, such as program modules, executed by one or more computers, processors, or other computing devices. Generally, program modules include routines, programs, objects, components, data structures, and so on that perform particular tasks or implement particular data types. Typically, the functionality of the program modules may be combined or distributed as desired in various embodiments.

Figure 5:
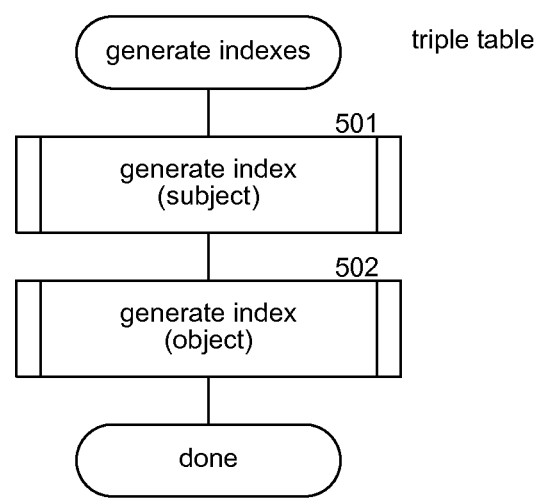
FIG. 5 is a flow diagram that illustrates the processing of the generate indexes component of the dynamic graph system in some embodiments.

FIG. 5 is a flow diagram that illustrates the processing of the generate indexes component of the dynamic graph system in some embodiments. The component is passed an indication of a triple table and generates a subject index and an object index for that triple table. The component may generate both a subject index and an object index, just a subject index, or just an object index. In block 501, the component invokes the generate index component passing an indication of the subject to generate a subject index. In block 502, the component invokes the generate index component passing an indication of the object to generate an object index. The component then completes.

Figure 6:
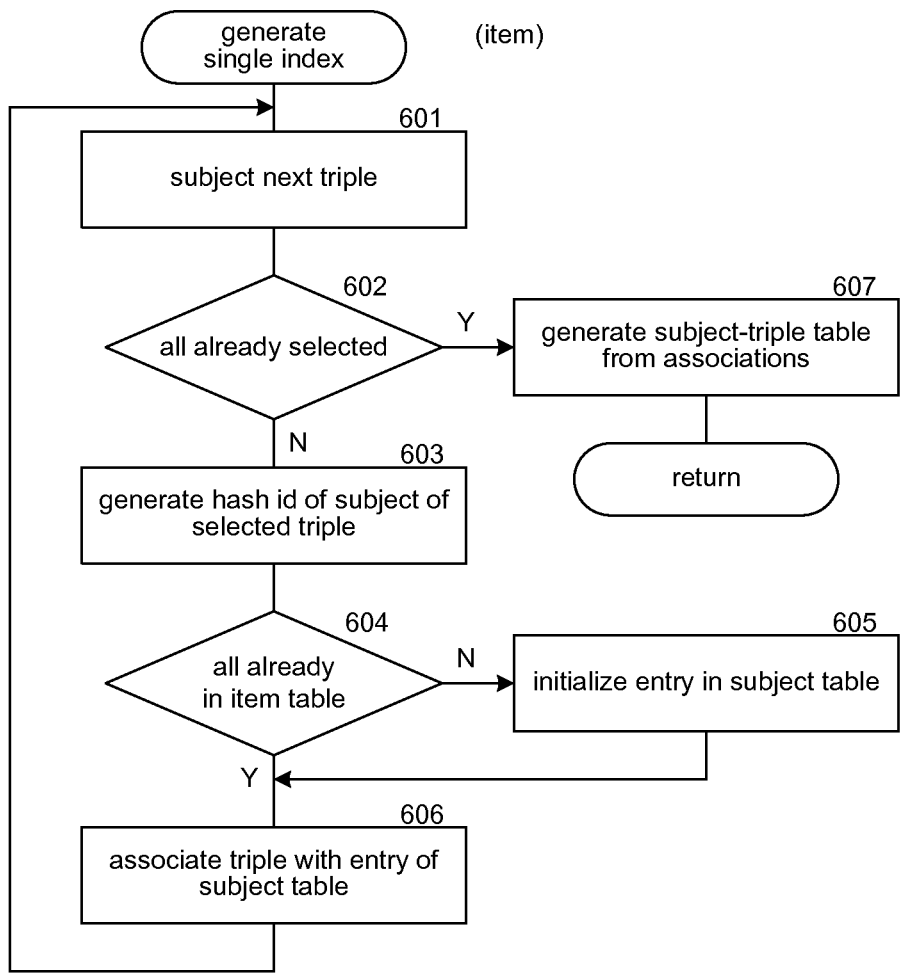
FIG. 6 a flow diagram that illustrates the processing of the generate single index component of the dynamic graph system in some embodiments.

FIG. 6 a flow diagram that illustrates the processing of the generate single index component of the dynamic graph system in some embodiments. The component is passed an indication of an item (i.e., subject or object) and generates the corresponding item index. In the following, the component is described in context assuming that the passed item indicates that the subject index is to be generated. The dynamic graph system may preprocess the triple table to identify the number of unique subjects and objects to determine the size of the adjacency matrix or may receive as input an indication of the maximum size of the adjacency matrix. In block 601, the component selects the next triple of the triple table. In decision block 602, if all the triples of the triple table have already been selected, then the component continues at block 607, else the component continues at block 603. In block 603, the component generates an identifier for the subject of the selected triple. For example, the component may use a hash algorithm to generate a hash identifier from a text value of the subject (e.g., "John Smith") to an integer (e.g., 1) indicating a row and column of the adjacency matrix. In decision block 604, if the corresponding entry of the subject table has been initialized, then the component continues at block 606, else the component continues at block 605. In block 605, the component initializes the entry of the subject table for the generated identifier to indicate that there is at least one corresponding triple and continues at block 606. In block 606, the component associates the selected triple with the entry of the subject table corresponding to the generated identifier. For example, the component may add an indication of the triple (e.g., an offset into the triple table) to a linked list of triples for that entry. The component then loops to block 601 to select the next triple of the triple table. In block 607, after all the triples have been selected and associated with the entries of the subject table, the component then generates the subject-triple table and updates the subject table. For example, the component may then sort each linked list in object order and then lay out the subject-triple table with entries corresponding to each triple in subject order and optionally in object order within subject. The component also updates the entries of the subject table to point to the corresponding entries of the subject-triple table.

Figure 7:
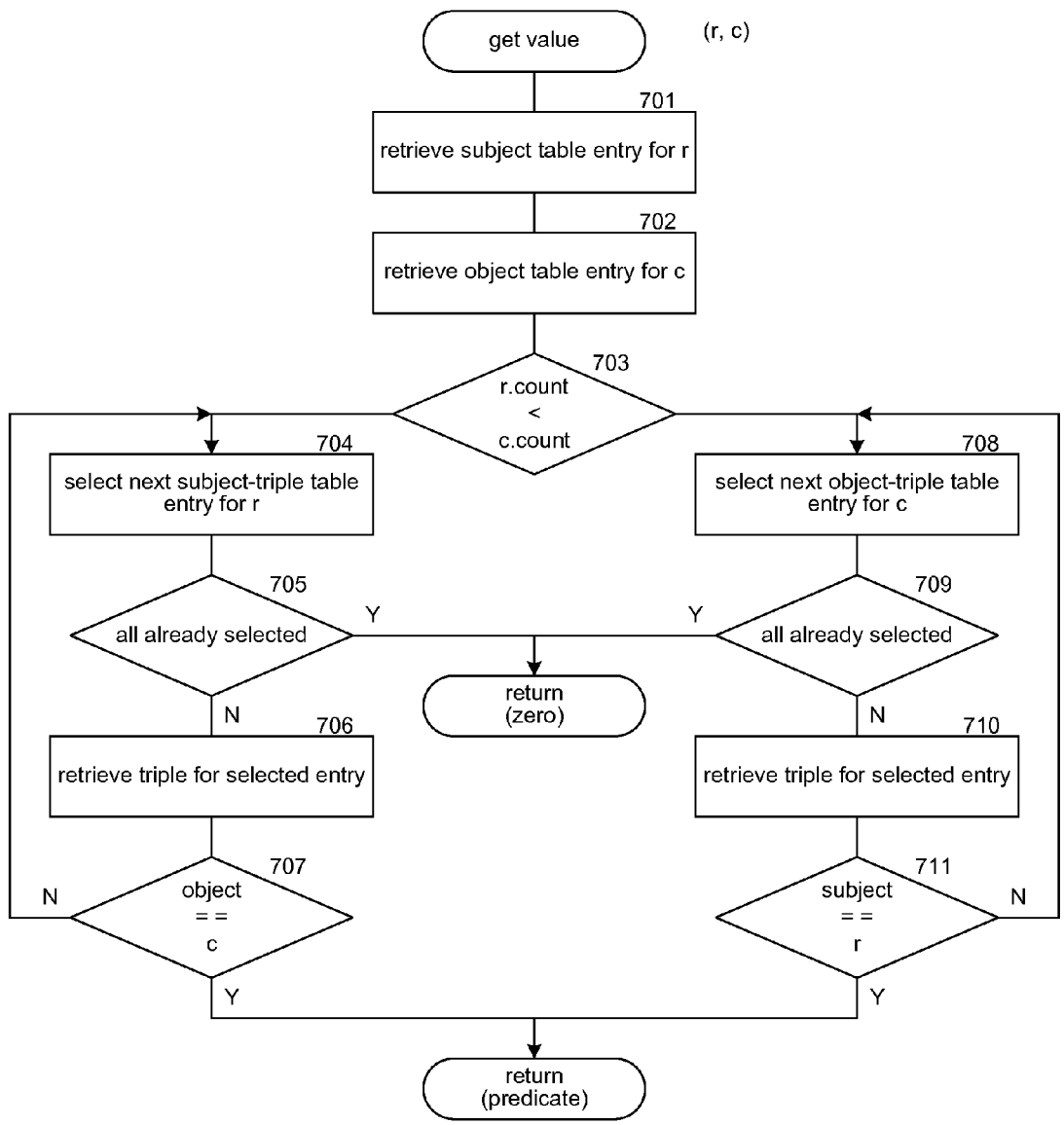
FIG. 7 is a flow diagram that illustrates the processing of a get value component of the dynamic graph system in some embodiments.

FIG. 7 is a flow diagram that illustrates the processing of a get value component of the dynamic graph system in some embodiments. The component is passed an indication of the row and column and returns the value of the corresponding element of the adjacency matrix. In one embodiment, the subject of a triple corresponds to a row of the adjacency matrix and the object of the triple corresponds to a column of the adjacency matrix. Also, the dynamic graph system may maintain both a subject index and an object index. The component retrieves the value using either the subject index or the object index, depending on whether the row or column has fewer values with non-distinguished values as indicated by the count in the entry for the row in the subject table and the count in the entry for the column of the object table. In block 701, the component retrieves the entry for the passed row from the subject table. In block 702, the component retrieves the entry for the passed column from the object table. In decision block 703, if the count of the entry from the subject table is less than the count of the entry from the column table, then the component continues at block 704, else the component continues at block 708. In blocks 704-707, the component identifies the value for the passed row and column using the subject index. In block 704, the component selects the next entry for the passed row for the subject-triple table. In decision block 705, if all the entries have already been selected, then the component returns an indication of the distinguished value, else the component continues at block 706. When the entries of the subject-triple table are ordered by object, then the component may return after an object corresponding to a column that is larger than the passed column is selected. In block 706, the component retrieves the triple for the selected entry from the triple table. In decision block 707, if the object of the retrieved triple matches the passed column, then the component returns the value of the predicate of the retrieved triple as the value of the element for the passed row and column, else the component loops to block 704 to select the next entry in the subject-triple table. In blocks 708-711, the component retrieves the value for the element using the object table in a manner similar to the processing in blocks 704-707 using the subject table.

Many graphic applications use conventional matrix functions to manipulate a graph that is represented as an adjacency matrix. These conventional matrix functions include a function to multiply two matrices, a function to multiple a matrix and a vector, a function to transpose a matrix, a function to get a value from the matrix, and so on. Such applications use a graphic API that is a conventional matrix API. Some matrix APIs provide functions to manipulate a matrix stored in a CSR format. Code Table 1 lists pseudo code that a graphic application may implement for performing a breadth first search of a graph that is stored as a matrix in a CSR format. The BreadthFirstSearch function is passed a graph G and a vertex startVertex and visits the vertices starting with startVertex in a breadth first manner. In line 3, the function transposes the graph. In line 4, the function initializes a set of vertices currentSet to the startVertex. The currentSet stores the vertices that are currently to be visited. In line 5, the function initializes a set of vertices verticesVisited to the startVertex. In lines 6-12, the function loops identifying the vertices at each level of the graph until there are no vertices in currentSet. In line 7, the function sets each entry of the vector selector with an entry for each vertex to 1 when the vertex is in currentSet and 0 otherwise. In line 8, the function invokes a sparse matrix-vector multiply function SpMVmult passing the graph and the selector. The invoked function returns a vector newVertices with a non-zero entry for each vertex at the next level of the graph. In line 9, the function sets the set newSet to contain all the vertices of newVertices. In line 10, the function sets currentSet to newSet minus verticesVisited. At this point, the function may perform the processing associated with the visiting of the vertices in currentSet. In line 11, the function adds newSet to vertices Visited.

CODE TABLE 1

```
1    BreadthFirstSearch( graph G, vertex startVertex )
2    {
3        if (G is not symmetric) G = transpose(G);
4        set currentSet = {startVertex};
5        set verticesVisited = {startVertex};
6        while( not__empty(currentSet) )
7            spVector selector = set based on currentSet;
8            spVector newVertices = SpMVmult(G, selector);
9            set newSet = {all i such that newVertices[i] <> 0 };
10           currentSet = newSet − verticesVisited;
11           verticesVisited = verticesVisited + newSet;
12       Endwhile
13   }
```

Code Table 2 lists pseudo code that illustrates an implementation of the sparse matrix-vector multiply function. The function is passed a graph G and a vector v to be multiplied and returns a vector r. In line 3, the function initializes the vector r. In line 4, the function sets the variable n to the number of vertices in the graph. In lines 5-12, the function loops processing each vertex i. In line 6, if the vector v has a non-zero value for vertex i, then the function calculates the result for vector i, else the result is zero. In lines 8-10, the function loops summing the products of the value of vertex i of the vector v and the non-zero values of ith column of the matrix. G.s represents the subject table of the graph, G.st represents the subject-triple of the graph, and G.t represents the triple table of the graph as illustrated in FIG. 3. In line 13, the function returns the result vector.

CODE TABLE 2

```
1    SpVector SpMVmult (graph G, SpVector v)
2    {
3        SpVector r = 0;
4        n = G.num__col( );
5        for i = 1, n
6            if v(i) <> 0
7                j = 0;
8                while j < G.s(i).count
9                    r(i) =+ G.t(G.st(G.s(i).offset + j++).offset).predicate *
                         v(i);
10               endwhile;
11           endif;
12       endfor;
13       return (r);
14   }
```

Figure 8:
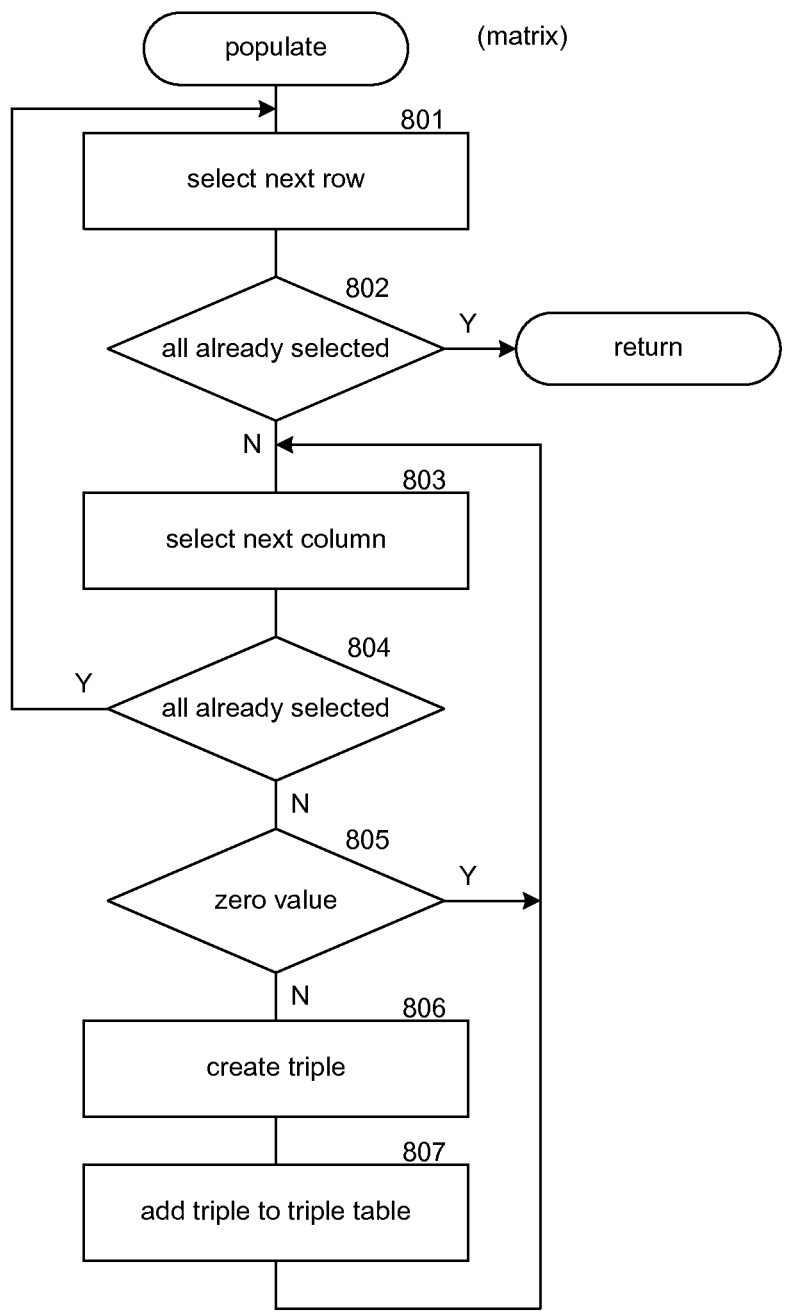
FIG. 8 is a flow diagram that illustrates the processing of a populate component of the dynamic graph system in some embodiments.

FIG. 8 is a flow diagram that illustrates the processing of a populate component of the dynamic graph system in some embodiments. The component may be passed a complete matrix or information describing just the non-distinguished values of the matrix and populates a triple table. In block 801, the component selects the next row of the matrix. In decision block 802, if all the rows have already been selected, then the component returns, else the component continues at block 803. In block 803, the component selects the next column of the matrix. In decision block 804, if all of the columns have already been selected, then the component loops to block 801 to select the next row, else the component continues at block 805. In decision block 805, if the element of the matrix at the selected row and column has a zero or distinguished value, then the component loops to block 803 to select the next column, else the component continues at block 806 to store the non-distinguished value as a triple. In block 806, the component creates a triple in which the subject is set based on the selected row, the predicate is set based on the value of the matrix, and the object is set based on the selected column. In block 807, the component adds the triple to the triple table and then loops to block 803 to select the next column.

Although the subject matter has been described in language specific to structural features and/or acts, it is to be understood that the subject matter defined in the appended claims is not necessarily limited to the specific features or acts described above. For example, one skilled in the art will appreciate that an adjacency matrix is typically represented as a square matrix and that the terms row and column simply refer to the two dimensions of the matrix and do not imply that either the row or column is horizontally or vertically arranged. Rather, the specific features and acts described above are disclosed as example forms of implementing the claims. Accordingly, the invention is not limited except as by the appended claims.

I claim:

1. A method in a computer system for providing a matrix interface to a data store of entries, the entries having a first field, a second field, and a third field, the method comprising:
    receiving a request to retrieve an element from a matrix for a source first dimension and a source second dimension, each entry of the data store representing an element of the matrix, the first field representing a first dimension of the matrix, the second field representing a second dimension of the matrix, and the third field representing a value for the element of the matrix at the represented first dimension and second dimension;
    determining whether an entry of the data store has a value for the first field that matches the source first dimension and a value for the second field that matches the source second dimension;
    upon determining that an entry of the data store has a value for the first field that matches the source first dimension and a value for the second field that matches the source second dimension, providing the value of the third field of that entry as the value of the element of the matrix for the source first dimension and the source second dimension; and
    upon determining that no entry of the data store has a value for the first field that matches the source first dimension and a value for the second field that matches the source second dimension, providing an indication that no entry of the data store has a value for the first field that matches the source first dimension and a value for the second field that matches the source second dimension
    wherein each entry of the data store represents a link between nodes of a graph and
    wherein the value of the first field represents a first node of the graph, the value of the second field represents a second node of the graph, and the value for the third field represents a value for a link connecting the first node and the second node.

2. The method of claim 1 wherein the data store represents a semantic data model with the first field being a subject, the second field being an object, and the third field being a predicate.

3. The method of claim 2 wherein the semantic data model is compatible with a Resource Description Framework.

4. The method of claim 1 wherein the matrix interface is a compressed sparse row interface.

5. The method of claim 4 wherein the request is received from an application developed to access a sparse matrix via the compressed sparse row interface.

6. The method of claim 1 wherein the determining of whether an entry of the data store has a value for the first field that matches the source first dimension and a value for the second field that matches the source second dimension include identifying entries of the data store that have a value for the first field that matches the source first dimension and then determining whether an identified entry has a value for the second field that matches the source second dimension.

7. A computer-readable storage medium that is not a transitory, propagating signal storing computer-executable instructions for controlling a computing system to provide a matrix interface to a data store of entries, each entry having a first field, a second field, and a third field, the computer-executable instructions comprising instructions that:
    receive a request to retrieve an element from a matrix for a source row and a source column, each entry of the data store representing an element of the matrix, the first field representing a source row of the matrix, the second field representing a source column of the matrix, and the third field representing a value for the element of the matrix at the represented source row and represented source column;
    identify whether an entry of the data store that has a value for the first field that matches the source row and a value for the second field that matches the source column;
    when an entry is identified as having a value for the first field that matches the source row and a value for the second field that matches the source column, supply the value of the third field of that entry as the value of the element of the matrix for the source row and the source column; and
    when an entry is not identified as having a value for the first field that matches the source row and a value for the second field that matches the source column, supply a distinguished value as the value of the element of the matrix for the source row and the source column
    wherein each entry of the data store represents a link between nodes of a graph and
    wherein the value of the first field represents a first node of the graph, the value of the second field represents a second node of the graph, and the value for the third field represents a value for a link connecting the first node and the second node.

8. The computer-readable storage medium of claim 7 wherein the data store represents a semantic data model with the first field being a subject, the second field being an object, and the third field being a predicate.

9. The computer-readable storage medium of claim 7 wherein the matrix interface is a compressed sparse row interface.

10. The computer-readable storage medium of claim 9 wherein the request is received from an application developed to access a sparse matrix via the compressed sparse row interface.

11. The computer-readable storage medium of claim 7 wherein the instructions that identify whether an entry of the data store that has a value for the first field that matches the source row and a value for the second field that matches the source column access an index that maps values to entries that contain those values.

12. A computer system for providing a matrix interface to a collection of data represented as triples, comprising:
    a computer-readable storage medium storing:
        a data store storing entries having a first field, a second field, and a third field wherein each entry of the data store represents a link between nodes of a graph and wherein the value of the first field represents a first node of the graph, the value of the second field represents a second node of the graph, and the value for the third field represents a value for a link connecting the first node and the second node;

computer-executable instructions that receive a request to retrieve an element from a matrix for a source first dimension and a source second dimension, an entry of the data store representing an element of the matrix, the first field of the entry representing a first dimension of the matrix, the second field of the entry representing a second dimension of the matrix, and the third field of the entry representing a value for the element of the matrix at the represented first dimension and the represented second dimension;

determining whether an entry of the data store has a value for the first field that matches the source first dimension and a value for the second field that matches the source second dimension;

upon determining that an entry of the data store has a value for the first field that matches the source first dimension and a value for the second field that matches the source second dimension, provide the value of the third field of that entry as the value of the element of the matrix for the source first dimension and the source second dimension; and upon determining that no entry of the data store has a value for the first field that matches the source first dimension and a value for the second field that matches the source second dimension, provide an indication that no entry of the data store has a value for the first field that matches the source first dimension and a value for the second field that matches the source second dimension; and a processor that executes the computer-executable instructions stored in the computer-readable storage medium.

13. The computer system of claim 12 wherein the collection represents a semantic data model with the fields representing a subject, a predicate, and an object.

14. The computer system of claim 13 wherein the matrix interface is a compressed sparse row interface.

\* \* \* \* \*